(12) United States Patent
Martinovic et al.

(10) Patent No.: US 11,392,692 B2
(45) Date of Patent: Jul. 19, 2022

(54) AUTHENTICATION DEVICE

(71) Applicant: Oxford University Innovation Limited, Oxford (GB)

(72) Inventors: Ivan Martinovic, Oxford (GB); Ivo Sluganovic, Oxford (GB)

(73) Assignee: OXFORD UNIVERSITY INNOVATION LIMITED

( * ) Notice: Subject to any disclaimer, the term of this patent is extended or adjusted under 35 U.S.C. 154(b) by 30 days.

(21) Appl. No.: 16/970,413

(22) PCT Filed: Feb. 20, 2019

(86) PCT No.: PCT/GB2019/050469
§ 371 (c)(1),
(2) Date: Aug. 17, 2020

(87) PCT Pub. No.: WO2019/162667
PCT Pub. Date: Aug. 29, 2019

(65) Prior Publication Data
US 2020/0410093 A1 Dec. 31, 2020

(30) Foreign Application Priority Data
Feb. 20, 2018 (GB) ..................................... 1802739

(51) Int. Cl.
*G06F 21/55* (2013.01)
*G06F 21/31* (2013.01)
(Continued)

(52) U.S. Cl.
CPC ............ *G06F 21/554* (2013.01); *G06F 21/31* (2013.01); *G06F 21/566* (2013.01);
(Continued)

(58) Field of Classification Search
CPC ...... G06F 21/554; G06F 21/31; G06F 21/566; G06F 21/567; G06F 21/82; G06F 2221/031; G06F 2221/0797
See application file for complete search history.

(56) References Cited

U.S. PATENT DOCUMENTS 6,850,252 B1 * 2/2005 Hoffberg ............ G06K 9/00369
348/E7.061
8,650,611 B2 * 2/2014 Heo ........................ G06F 21/31
726/2
(Continued)

FOREIGN PATENT DOCUMENTS

EP 3 065 377 A1 9/2016

OTHER PUBLICATIONS

International Search Report and Written Opinion for PCT/GB2019/050469, dated Apr. 5, 2019, pp. 1-11.
(Continued)

*Primary Examiner* — Hosuk Song
(74) *Attorney, Agent, or Firm* — Thomas|Horstemeyer, LLP

(57) ABSTRACT

An authentication device (101) for verifying the security of a task being performed on an electronic device (105) operated by a user (102). The authentication device includes an image capture device for capturing image data of the electronic device and of the user interacting with the electronic device. The authentication device also includes processing circuitry for processing the captured image data to determine when the electronic device is performing a security related task and to determine when the electronic device has been subject to an event that has compromised or may compromise the security of the electronic device. The authentication
(Continued)

device also includes an audio or visual output for providing instructions to the user to interact with the electronic device and for advising the user that the electronic device has been subject to an event that has compromised or may compromise the security of the electronic device.

20 Claims, 3 Drawing Sheets

(51) Int. Cl.
    *G06F 21/56*     (2013.01)
    *G06F 21/82*     (2013.01)
(52) U.S. Cl.
    CPC ............ *G06F 21/567* (2013.01); *G06F 21/82* (2013.01); *G06F 2221/031* (2013.01); *G06F 2221/0797* (2013.01)

(56) References Cited

U.S. PATENT DOCUMENTS

| | | | |
|---|---|---|---|
| 8,966,268 B2 * | 2/2015 | Marien | H04L 9/006 |
| | | | 713/172 |
| 9,961,499 B2 * | 5/2018 | Mei | H04B 17/318 |
| 10,250,597 B2 * | 4/2019 | Hoyos | G06F 16/955 |
| 10,749,876 B2 * | 8/2020 | Bendersky | G06F 21/32 |
| 2010/0214413 A1 | 8/2010 | Lin et al. | |
| 2012/0144455 A1 | 6/2012 | Lazar et al. | |
| 2016/0147492 A1 | 5/2016 | Fugate et al. | |
| 2019/0102767 A1 | 4/2019 | Ericson | |

OTHER PUBLICATIONS

UK Search Report for GB 1802739.1, dated Aug. 7, 2018, pp. 1-5.
Ankit Kumar Jain et al: "Phi shing Detection: Analysis of Visual Similarity Based Approaches", Security and Communication Networks, vol. 2017, Jan. 10, 2017 (Jan. 10, 2017), pp. 1-20.

\* cited by examiner

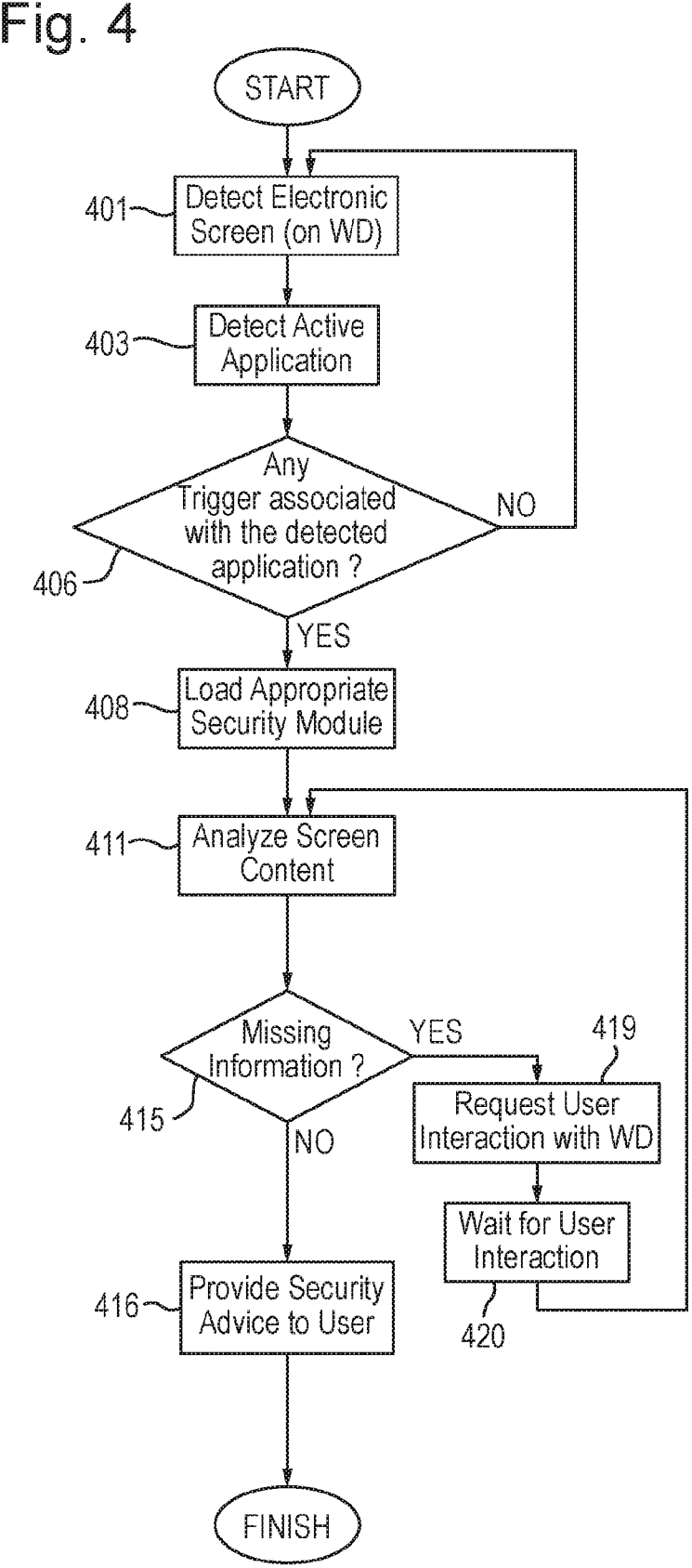

AUTHENTICATION DEVICE

CROSS-REFERENCE TO RELATED APPLICATIONS

This application is the National Stage of International Application No. PCT/GB2019/050469, filed Feb. 20, 2019, which claims priority to GB 1802739.1, filed Feb. 20, 2018, which are entirely incorporated herein by reference.

This invention relates to an authentication device for and a method of verifying the security of a task being performed on an electronic device, in particular to an authentication device for and a method of determining when the security of an electronic device has been compromised.

There are many situations when using a computer having connections to other devices (e.g. via the internet) that the computer may be compromised by cyber attack. There are many different types of cyber attacks, including phishing in which a rogue operator provides a fake website, email or security update, for example, in order to lure the user of the computer into providing some of their confidential information (e.g. security or banking details) by posing as an authentic service provider.

Such attacks may compromise the security of the computer and of the user, leading to the leaking of confidential information and the loss of money, for example.

Cyber attacks may be able to be countered by running specialist (e.g. anti-virus) software or by using verification techniques (e.g. using a chip and pin reader for online banking or using biometric authentication). However, such software or verification device, or the connection between an authentication device and the computer, may itself have been compromised by a cyber attack. Similarly, cyber attacks such as spoofing and impersonation may also be successful even when digital certificates are used, for example.

This makes it difficult for a user to be able to trust using a computer for a sensitive, security related task that involves the exchange of some of their confidential information, for example.

The aim of the present invention is to provide an improved authentication device for determining when a task being performed on another device is being performed securely.

When viewed from a first aspect the invention provides an authentication device for verifying the security of a task being performed on an electronic device operated by a user, wherein the authentication device comprises:

an image capture device for capturing image data of the electronic device and of the user interacting with the electronic device;

processing circuitry for processing the captured image data to determine when the electronic device is performing a security related task and to determine when the electronic device has been subject to an event that has compromised or may compromise the security of the electronic device; and an audio or visual output for providing instructions to the user to interact with the electronic device and for advising the user that the electronic device has been subject to an event that has compromised or may compromise the security of the electronic device;

wherein the authentication device is arranged to operate in a secure mode, in which no data is exchanged between the authentication device and the electronic device, to control:

the image capture device to capture image data of the electronic device;

the processing circuitry to process the captured image data to determine when the electronic device is performing a security related task;

the audio or visual output, when the processing circuitry has determined that the electronic device is performing a security related task, to provide instructions to the user to interact with the electronic device, wherein the instructions are based on the processing of the captured image data;

the image capture device to capture image data of the user interacting with the electronic device and the response of the electronic device to the user's interaction;

the processing circuitry to process the image data captured of the user interacting with the electronic device and the response of the electronic device to the user's interaction, to determine when the electronic device has been subject to an event that has compromised or may compromise the security of the electronic device; and the audio or visual output, when the processing circuitry has determined that the electronic device has been subject to an event that has compromised or may compromise the security of the electronic device, to advise the user that the electronic device has been subject to an event that has compromised or may compromise the security of the electronic device.

When viewed from a second aspect the invention provides a method of verifying the security of a task being performed on an electronic device operated by a user, the method being performed on an authentication device operating in a secure mode in which no data is exchanged between the authentication device and the electronic device, and the method comprising:

capturing image data of the electronic device;

processing the captured image data to determine when the electronic device is performing a security related task;

when the electronic device is determined to be performing a security related task, providing instructions to the user to interact with the electronic device, wherein the instructions are based on the processing of the captured image data;

capturing image data of the user interacting with the electronic device and of the response of the electronic device to the user's interaction;

processing the image data to determine when the electronic device has been subject to an event that has compromised or may compromise the security of the electronic device; and advising the user that the electronic device has been subject to an event that has compromised or may compromise the security of the electronic device, when the electronic device is determined to have been subject to an event that has been compromised or may compromise the security of the electronic device.

The present invention provides an authentication device for and a method of verifying the security of a task running on an electronic device that is operated by a user. The authentication device includes an image capture device, processing circuitry and an audio or visual output. The authentication device is configured to operate in a secure mode in which the authentication device has no data communication with the electronic device, such that no data is exchanged between the authentication device and the electronic device while the authentication device is in the secure mode.

The present invention helps to verify the security of a task that is running on the electronic device by determining when the electronic device has been compromised or has been subject to an event (e.g. a cyber attack) that may (e.g. has the potential or ability to) compromise the security of the device. This may, for example, be that the electronic device has fallen victim to a cyber attack and has been infected, or that the electronic device has been received a suspicious communication (e.g. an email containing a phishing attack or virus) but which has yet to compromise the security of the device (but may do so if not identified and the appropriate action taken). The present invention thus helps to identify such security related issues associated with a task running on the electronic device and identifies them such that action may be able to be taken before the electronic device's security is compromised (e.g. further).

The security related task being performed on the electronic device may be any task whose security may (e.g. has the potential or ability to) be compromised, e.g. by a cyber attack. Such tasks include browsing a webpage, receiving and sending an email, running a security update, using a cash machine or any other type of task that involves a connection to another electronic device, e.g. via the internet, and through which an unauthorised third party may pose as a genuine service provider.

In order to verify the security of the task that is running on the electronic device, the authentication device, operating in its secure mode, controls the image capture device to capture image data of the task that is running on the electronic device. This image data is processed by the processing circuitry to determine when the task being performed by the electronic device is a security related task.

When the electronic device is determined to be running a security related task, the audio or visual output of the authentication device provides the user with instructions as to how to interact with the electronic device (e.g. to gain further information as to the nature of the security related task being run on the electronic device). The image capture device then captures image data of the user interacting with the electronic device (i.e. in accordance with the instructions) and the response of the electronic device to the user's interaction.

The processing circuitry then processes the captured image data (of the user interacting with the electronic device and the response of the electronic device to the user's interaction) and determines when the electronic device has been subject to an event that has compromised or may compromise the security of the electronic device (e.g. when the electronic device has been or is being subject to a cyber attack). When the authentication device has established that the electronic device has been subject to an event that has compromised or may compromise the security of the electronic device, the audio or visual output is arranged to advise the user that the electronic device has been subject to an event that has compromised or may compromise the security of the electronic device, e.g. to alert the user not to continue with the task or to seek further assistance to resolve the problem.

Thus it will be appreciated that the "trusted" authentication device, which is able to operate in a secure mode such that it does not have a data connection with the electronic device running the task (e.g. while the task, or at least the security verification thereof, is running), means that the authentication device can assess the nature of the task running on the electronic device (i.e. as to whether it has been subject to an event that has compromised or may compromise the security of the electronic device), without the authentication device itself being compromised before or during the task that is being executed on the electronic device (e.g. by whatever cyber attack may have caused the event that has compromised or may compromise the electronic device).

Despite this lack of a data connection between the authentication device and the electronic device, the interaction of the user with the electronic device (which is guided by the authentication device's instructions) is able to probe and, e.g., change the state of the electronic device, thus helping to establish whether or not the electronic device has been subject to an event that has compromised or may compromise the security of the electronic device, without risking the security of the authentication device being compromised.

The authentication device and method in at least preferred embodiments of the present invention may therefore be able to verify that security related information and interactions involved with a task, which is being performed on an electronic device, is being performed securely. As a non-limiting example, the authentication device and method help to observe and verify that a user (e.g. when they receive a request to connect to their bank's website) follows all the required steps that verify the authenticity of the task being performed (e.g. of the bank's webpage), therefore helping to verify the integrity of the task and to protect the confidentiality of the user's information.

The authentication device may comprise any suitable and desired device. In one embodiment the authentication device comprises a handheld device, e.g. a mobile telephone. In one embodiment the authentication device comprises a wearable device, e.g. a head-mounted device, e.g. an augmented reality (AR) device. Preferably the authentication device is operated by the user.

The electronic device may comprise any suitable and desired electronic device. For example, the electronic device may comprise a computer (e.g. desktop, laptop or tablet), a mobile telephone, a cash machine, a payment terminal, a smart TV, a car or any other electronic device with which the user may interact. Preferably the electronic device comprises processing circuitry arranged to control its operation. Preferably the electronic device comprises a display screen to display an output associated with its operation, e.g. of the task being performed on the electronic device.

The image capture device may comprise any suitable and desired device for capturing image data of the electronic device and of the user interacting with the electronic device. Preferably the image capture device comprises a (e.g. video) camera. Preferably the image capture device is arranged to capture a sequence of frames of (e.g. video) image data. This helps particularly when the user is interacting with the electronic device to determine the response of the electronic device to the user's interaction.

Preferably the user directs the image capture device of the authentication device towards the (e.g. display screen of the) electronic device to capture the image data.

The processing circuitry of the authentication device may process the captured image data in any and suitable and desired way to determine when the electronic device is performing a security related task and to determine when the security of the electronic device has been or may be compromised. Preferably the processing circuitry comprises or implements one or more processing modules, e.g. as part of an application executed on the authentication device.

In one embodiment the processing circuitry comprises or implements a video capture module arranged to capture the image data from the image capture device. Preferably the video capture module is arranged to identify the (e.g. display of the) electronic device in the captured image data.

In one embodiment the processing circuitry comprises or implements a video analysis module arranged to analyse the captured image data. Preferably the video analysis module is arranged to analyse the (e.g. display of the) electronic device that has been identified in the captured image data by the video capture module.

Thus, once the (e.g. display of the) electronic device has been identified by the video capture module, preferably the video analysis module is arranged to analyse the (e.g. display of the) electronic device in the captured image data, e.g. to determine when the electronic device is performing a security related task. Preferably the video analysis module is arranged (e.g. once the (e.g. display of the) electronic device has been identified by the video capture module) to track the (e.g. display of the) electronic device in the captured image data (e.g. so that it can continue to analyse the (e.g. display of the) electronic device in the captured image data). Preferably the video analysis module is arranged to determine the type of security related task the electronic device is performing.

The video analysis module may analyse the captured image data in any suitable and desired way, e.g. to determine when the electronic device is performing a security related task. Preferably the video analysis module is arranged to analyse the captured image data to determine the operating system that the electronic device is using or the type of device that the electronic device comprises. This helps to determine when the electronic device is performing a security related task, e.g. because it enables the video analysis module to look for certain visual triggers that are associated with the operating system and may be a signature of a security related task. The video analysis module may also help to determine a type of electronic device that typically performs a security related task (e.g. an automated teller machine (ATM)). For example, identifying the type of device that the electronic device comprises may enable the authentication device to know the form of the user interface of the electronic device (e.g. its external buttons that are available) which may inform the authentication device for when providing instructions to the user to interact with the electronic device.

In one embodiment the video analysis module is arranged to divide the (e.g. each frame of or the identified display of the electronic device in the) captured image data into blocks of image data. Preferably the video analysis module is arranged to analyse each block of image data separately.

The (e.g. frame of or the identified display of the electronic device in the) image data may be divided equally into blocks, e.g. for the purposes of parallel processing. However, preferably the video analysis module is arranged to divide the (e.g. each frame of or the identified display of the electronic device in the) captured image data into blocks of image data that correspond to applications being executed on the electronic device. Thus preferably the video analysis module is arranged to analyse the captured image data to identify applications displayed on the display of the electronic device (e.g. a browser opening a webpage or an email client). This helps to determine when a particular application may be performing a security related task on the electronic device.

In one embodiment the processing circuitry of the authentication device comprises or implements a security analysis module arranged to determine if the electronic device has been subject to an event that has compromised or may compromise the security of the electronic device. Thus preferably, once the video analysis module has analysed the (e.g. display of the) electronic device in the captured image data (e.g. to determine when the electronic device is performing a security related task), the security analysis module uses this analysis (e.g. the identification of features, applications, signatures of a security related task, as determined by the video analysis module, preferably along with the captured image data itself) to determine when the security of the electronic device has been or may be compromised.

The authentication device may comprise only a single security analysis module. However, in one embodiment the authentication device comprises a plurality of security analysis modules. In this embodiment, preferably the plurality of security analysis modules are arranged to be used to analyse different types of security related tasks respectively that the electronic device is performing or are arranged to be used to analyse different types of electronic devices that the authentication device may be used to verify.

Thus the authentication device may use the appropriate security analysis module to determine when the security of the electronic device has been or may be compromised, depending on the type of security related task that the authentication device has been determined to be performing. This may be a more efficient way of processing the captured image data owing, for example, to the different types of indicators for different types of security related tasks that may identify when the security of the authentication device has been or may be compromised. For example, the indicator that a website is subject to a phishing attack may be different to the indicator that an email is subject to a spoofing attack.

In one embodiment the processing circuitry of the authentication device comprises or implements a feedback module arranged to determine (e.g. from the processed image data) when the user has followed the instructions provided to them correctly. Preferably the feedback module is arranged to provide further instructions when the user has not followed the instructions correctly, e.g. to enable the authentication device to collect all the information it needs to determine when the security of the electronic device has been or may be compromised.

The audio or visual output, for providing instructions to the user and for advising the user, may comprise any suitable and desired output. In a preferred embodiment the output comprises a display. The nature of the display may depend on the type of authentication device being used. Thus, the display may comprise a display screen, e.g. when the authentication device comprises a computer or mobile telephone. When the authentication device comprises an augmented reality (AR) device, for example, the display may comprise a head-up display.

Preferably the display of the authentication device is arranged to be overlaid on the (e.g. display of the) electronic device. Thus, for example, the instructions provided to user to for the user to interact with the electronic device may be overlaid on the (e.g. display of the) electronic device. Preferably the instructions are overlaid on the (e.g. display of the) electronic device to guide the user to the part of the electronic device with which the user has been instructed to interact with (e.g. either directly (e.g. on a touchscreen of the electronic device) or indirectly (e.g. via a mouse or other input device)). This helps to provide instructions to the user which are straightforward to follow, such that they interact with the electronic device according to the instructions and therefore obtain the information from the electronic device that the processing circuitry requires to determine when the security of the electronic device has been or may be compromised.

The authentication device is arranged to operate in a secure mode. In the secure mode, no data is exchanged between the authentication device and the electronic device, i.e. there is an "air gap" between the authentication device and the electronic device. Thus preferably there is no data connection between the authentication device and the electronic device, e.g. no network or internet link, no wired or wireless communication, etc., between the authentication device and the electronic device in the secure mode. Preferably the authentication device and the electronic device are unrelated devices (e.g. not part of the same system or network). While a user may own only a single authentication device, the user may operate multiple different electronic devices (the security of whose tasks may require verification) in the course of a day.

The authentication device may always be operated in the secure mode, e.g. when verifying the security of a task being performed on the electronic device. However, in one embodiment the authentication device is arranged to be switched into the secure mode (e.g. from a normal (e.g. unsecure) mode), e.g. when the authentication device begins to verify the security of the task being performed on the electronic device. As will be discussed below, this may allow the authentication device to be switched out of the secure mode such that it is able to exchange data with the electronic device.

In the secure mode, the (e.g. processing circuitry of the) authentication device controls the image capture device to capture image data of the electronic device. Thus preferably the user is instructed by the authentication device to direct the image capture device at the electronic device, such that the image capture device captures image data of the electronic device, e.g. for the video capture module. Preferably the video analysis module detects when the electronic device is captured in the image data, i.e. when the electronic device is within the field of view of the image capture device. Preferably the authentication device is arranged to alert the user if the electronic device is not within the field of view of the image capture device, e.g. so that the user may direct the image capture device appropriately.

Still in the secure mode, once the image data has been captured, the processing circuitry is controlled to process the captured image data to determine when the electronic device is performing a security related task. As outlined above, preferably this is determined by the video analysis module.

The processing circuitry (e.g. the video analysis module) may determine that the electronic device is performing a security related task by identifying a signature of a security related task (e.g. a browser window, an email client, a security update window, a cash machine, etc.).

When the processing circuitry determines that the electronic device is performing a security related task, the audio or visual output is then controlled (e.g. by the processing circuitry) to provide instructions to the user to interact with the electronic device. However, in one embodiment, the captured image data is processed (by the processing circuitry, in the secure mode) to determine when the security of the electronic device has (or may have) been or may be compromised, e.g. before the instructions have been provided to the user. This may then obviate the need for the user to further interrogate the electronic device, e.g. the authentication device may be able to provide instructions to the user, via the audio or visual output, to advise the user that the security of the electronic device has been or may be compromised (or the processing circuitry may determine that the electronic device has not been subject to an event that has compromised or may compromise its security, and advise the user accordingly).

Alternatively, if the processing circuitry determines that the electronic device may have been subject to an event that has compromised or may compromise its security (but, for example, is not certain), the instructions to the user to interact with the electronic device may then be provided to obtain further information from the electronic device in order to come to a more certain determination of whether the security of the electronic device has been or may be compromised. Preferably the processing circuitry is arranged to identify a "trigger" that is indicative that the device may have been subject to an event that has compromised or may compromise its security (e.g. that the visual layout of the electronic device is not how it is expected to be, e.g. for the type of security related task that has been identified as being performed by the electronic device). When the processing circuitry has identified such a trigger, preferably the instructions provided to the user to interact with the electronic device are based on the identified trigger.

The processing circuitry may determine that the electronic device has (or may have) been subject to an event that has compromised or may compromise its security at this stage in any suitable and desired way. Preferably the processing circuitry (e.g. the video analysis module and/or the security analysis module) determines that the electronic device has been subject to an event that has compromised or may compromise its security as part of the step of determining when the electronic device is performing a security related task.

For example, the processing circuitry may be arranged to compare the visual layout of the (e.g. display of the) electronic device in the captured image data with the visual layout of the (e.g. display of the) electronic device in a reference image. This helps to compare the appearance of the electronic device being operated by the user with the expected (e.g. legitimate) appearance of the electronic device. The visual layout of the whole of the (e.g. display of the) electronic device may be compared (e.g. for an automated teller machine (ATM)) or only a portion of the (e.g. display of the) electronic device may be compared (e.g. for an application window shown on the display of the electronic device).

For example, the processing circuitry may be arranged to check the text that is shown on the (e.g. display of the) electronic device in the captured image data. When an electronic device has been subject to an event that has compromised or may compromise its security, the text subsequently displayed (e.g. on a website or in an email) may contain typographical or grammatical errors, may contain phraseology known to be associated with cyber attacks, etc. The website address and/or the email address (when appropriate) may also be checked to determine if they are known to be associated with cyber attacks.

When the electronic device is (e.g. usually) located in a fixed location or a set of locations (e.g. an ATM, a point of sale (POS) terminal or a self-driving vehicle), the processing circuitry may be arranged to check that the location of the electronic device corresponds to the expected (e.g. registered) location of the electronic device, for example. The processing circuitry may also be arranged to identify the serial number of the ATM from the processed image data captured and use this to determine when the security of the ATM has been or may be compromised, e.g. to compare the credentials of the ATM identified from the processed image data captured with the expected credentials for that ATM. The processing circuitry may also be arranged to identify the card input of the ATM and use this to determine when the security of the ATM has been or may be compromised, e.g. to compare the appearance of the card input identified from the processed image data captured with the expected appearance.

Still in the secure mode, the user is provided instructions to interact with the electronic device, by the audio or visual output, controlled by the (e.g. processing circuitry of the) authentication device, so that the authentication device may investigate when the security of the electronic device has been or may be compromised. The instructions are based on the processing of the captured image data, e.g. based on the security related task that the electronic device is determined to be performing, so that the authentication device can obtain the appropriate information for the particular security related task being performed. The instructions may also be based on the type of electronic device being used and/or any identified triggers that indicate that the security of the electronic device may have been or may be compromised, as discussed above.

In one embodiment, the authentication device controls the (or a particular) security analysis module to provide the instructions to the user (via the audio or visual output). The particular security module (e.g. from a plurality of different security analysis modules) may be chosen to be used based on the particular security related task that the electronic device is determined to be performing and/or on a trigger or triggers that have been identified.

The instructions tell the user how to interact with the electronic device so that the authentication device may further analyse the nature of the security related task being performed on the electronic device in order to determine when the security of the electronic device has been or may be compromised. The instructions may be generated by a machine learning model, e.g. accessed by the authentication device from a memory (e.g. of the authentication device), from an online database or a combination thereof.

For example, the instructions may comprise one or more of: instructing the user to move a cursor on the display of the electronic device, instructing the user to click buttons on the electronic device, instructing the user to type information into the electronic device, instructing the user to insert a card (or other device) into the electronic device, etc. All of these interactions are preferably intended to cause the electronic device to respond to reveal further information that may be used to determine when the security of the electronic device has been or may be compromised.

Thus, based on the instructions, the user interacts with the electronic device, while the image capture device is controlled to capture image data of the user interacting with the electronic device (e.g. the mouse or typing movements of the user on the electronic device) and the electronic device's response to the user's interaction (e.g. the changes on the display of the electronic device as a result of the user's interaction).

The processing circuitry then processes the captured image data of the user's interaction with the electronic device and the electronic device's response to determine when the security of the electronic device has been or may be compromised. The processing circuitry (e.g. the (particular) security analysis module) may determine, using the processed image data that is captured, when the electronic device has been subject to an event that has compromised or may compromise the security of the electronic device, in any suitable and desired way. Preferably the processing circuitry compares the response of the electronic device to the user's interaction with the expected response when the electronic device has not been subject to an event that has compromised or may compromise the security of the electronic device, to determine when the security of the electronic device has been or may be compromised. Therefore, when the response of the electronic device to the user's interaction is not the same as the expected response, this may indicate that the electronic device has been subject to an event that has compromised or may compromise the security of the electronic device.

The processing circuitry (e.g. the security analysis module) may use machine learning to determine different responses of the electronic device to the user's interaction, e.g. when the electronic device has and has not been subject to an event that has compromised or may compromise the security of the electronic device.

As outlined above, the instructions provided to the user, and thus the interaction of the user with the electronic device, may depend on the type of electronic device being used, the particular security related task that is being performed by the electronic device and any "triggers" that may already have been identified. Therefore, the processing circuitry (e.g. the security analysis module) may look for different types of responses depending on the particular instructions that the user has been provided with.

In addition to the ways outlined above in which the processing circuitry may determine when the electronic device has been subject to an event that has compromised or may compromise the security of the electronic device (which are equally applicable at this stage), the processing circuitry (e.g. the security analysis module) may determine that the electronic device has been subject to an event that has compromised or may compromise the security of the electronic device using the processed image data captured by one or more of the following examples.

For example, the processing circuitry may identify the domain name (e.g. of a website or an email address) associated with the security related task being performed by the electronic device and use this to determine when the electronic device has been subject to an event that has compromised or may compromise the security of the electronic device (e.g. by comparing against domain names known to be associated with cyber attacks). Thus, for example, the user may be instructed to interact with the electronic device to reveal the domain name (e.g. by pointing a cursor to a particular location on the display of the electronic device).

For example, the processing circuitry may identify a digital or security certificate (e.g. secure sockets layer (SSL)) associated with the security related task being performed by the electronic device (or the absence of such a security certificate) and use this (e.g. the information (credentials) in the security certificate) to determine when the electronic device has been subject to an event that has compromised or may compromise the security of the electronic device (e.g. by determining when the certificate does not conform to an expected format (e.g. X509)). Thus, for example, the user may be instructed to interact with the electronic device to reveal the details of the security certificate.

The processing circuitry (e.g. the feedback module) is preferably arranged to process the captured image data to determine when the user has followed the instructions provided to them correctly and, e.g., provide further instructions to user (via the audio or visual output of the authentication device) to interact with the electronic device.

The processing circuitry (e.g. the feedback module) is preferably arranged to process the captured image data to determine when further information is required from the electronic device (to determine when the electronic device has been subject to an event that has compromised or may compromise the security of the electronic device), e.g. even when the user has performed the instructions correctly. For example, a first set of instructions provided to the user may not (e.g. always) reveal sufficient information from the interaction of the user with the electronic device (in accordance with the instructions) to enable the processing circuitry to determine that the electronic device has been subject to an event that has compromised or may compromise the security of the electronic device. Thus a further set of instructions is preferably provided to enable further information to be gathered to help to determine when the electronic device has been subject to an event that has compromised or may compromise the security of the electronic device, i.e. preferably the authentication device is arranged to control the audio or visual output, when the processing circuitry has determined that further information is required from the electronic device, to provide further instructions to the user to interact with the electronic device, wherein the instructions are based on the processing of the captured image data.

When further instructions are provided by the audio or visual output for the user to interact with the electronic device, preferably then the above steps of the image capture device capturing image data of the user interacting with the electronic device and the electronic device's response to the user's interaction, and the processing circuitry processing the captured image data to determine when the electronic device has been subject to an event that has compromised or may compromise the security of the electronic device are repeated as appropriate. Preferably these steps are repeated until the authentication device has captured sufficient information to allow it to determine when the electronic device has been subject to an event that has compromised or may compromise the security of the electronic device (or, e.g., not, as the case may be).

When the processing circuitry has determined that the electronic device has been subject to an event that has compromised or may compromise the security of the electronic device (or, e.g., not, as the case may be), the audio or visual output is controlled (e.g. by the processing circuitry) to advise the user that the security of the electronic device has been compromised (or, e.g., not, as the case may be). When it has been determined that the electronic device has been subject to an event that has compromised or may compromise the security of the electronic device, the user may be provided with instructions (e.g. to interact with the electronic device) to deal with (e.g. resolve) the compromised security of the electronic device or the event that may comprise the security of the electronic device. This may be to stop using the electronic device, to report the incident to an administrator, to run an (e.g. anti-virus) application on the electronic device, etc.

Alternatively, when the processing circuitry has determined that the electronic device has not been subject to an event that has compromised or may compromise the security of the electronic device, the user may be advised that they may continue to use the electronic device safely.

At this stage, the authentication device may be switched out of its secure mode. This may allow the authentication device to exchange data with the electronic device. The authentication device may be allowed to exchange data with the electronic device even when the security of the electronic device may have been compromised. This may allow the authentication device to interact with (e.g. control) the electronic device, e.g. in order to capture further information from the electronic device to determine when the electronic device has been subject to an event that has compromised or may compromise the security of the electronic device.

In one embodiment, when the authentication device has determined that the electronic device has not been subject to an event that has compromised or may compromise the security of the electronic device (and, e.g., the authentication device has been switched out of its secure mode), the authentication device may allow the user access (e.g. through a password management module) to a (e.g. stored) password for use with the task that is being performed by the electronic device, e.g. so that they may be able to continue with the task.

The method may be performed in any suitable and desired way and on any suitable and desired platform. In a preferred embodiment at least some steps of the method of verifying the security of a task being performed on an electronic device are performed by processing circuitry.

The methods in accordance with the present invention may be implemented at least partially using software, e.g. computer programs. It will thus be seen that when viewed from further aspects the present invention provides computer software specifically adapted to carry out the methods described herein when installed on a data processor, a computer program element comprising computer software code portions for performing the methods described herein when the program element is run on a data processor, and a computer program comprising code adapted to perform all the steps of a method or of the methods described herein when the program is run on a data processing system.

The present invention also extends to a computer software carrier comprising such software arranged (or which when used to operate a data processing system, or microprocessor system comprising a data processor causes in conjunction with said data processor) to carry out the steps of the methods of the present invention. Such a computer software carrier could be a physical storage medium such as a ROM chip, CD ROM, DVD, RAM, flash memory or disk, or could be a signal such as an electronic signal over wires, an optical signal or a radio signal such as to a satellite or the like.

It will further be appreciated that not all steps of the methods of the present invention need be carried out by computer software and thus from a further broad embodiment the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions fixed on a tangible, non-transitory medium, such as a computer readable medium, for example, diskette, CD ROM, DVD, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic or optical, or transmitted using any communications technology, present or future, including but not limited to optical, infrared or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

Various embodiments of the present invention will now be described by way of example only and with reference to the accompanying drawings, in which:

FIG. 4 shows a flow chart of the operation of an embodiment of the invention.

There are a number of scenarios in which it is helpful to be able to verify that a security related task being performed on an electronic device has not been subject to an event that has or could compromise the security of the electronic device, e.g. by a cyber attack. Embodiments of the present invention, as will now be described, provide an authentication device arranged to verify the security of such a task, so that the user may determine when the task is safe to continue with.

Figure 1:
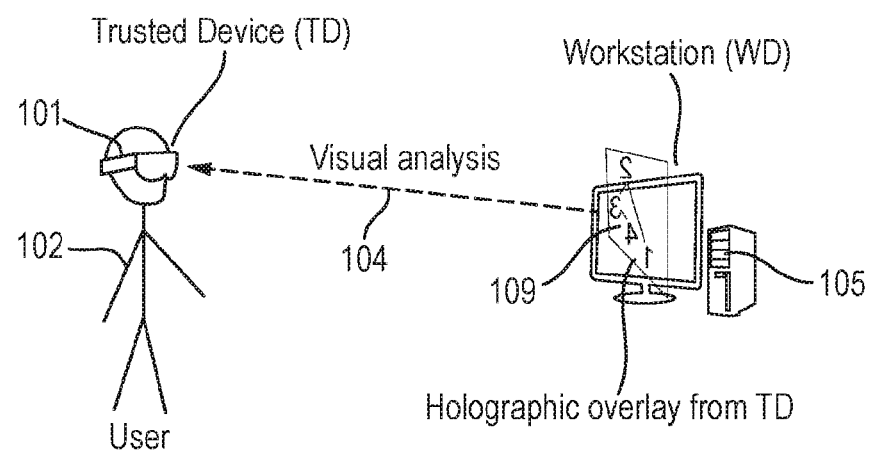
FIG. 1 shows schematically a device according to an embodiment of the invention.

FIG. 1 shows schematically a "trusted" authentication device 101 according to an embodiment of the invention. In FIG. 1 the trusted device 101 is embodied as a head-mounted augmented reality (AR) display that is worn by a user 102. As will be described, the trusted device 101 is configured to be used to assist the user 102 with a task to be completed that is being executed on a computer workstation 105. The task will generally be a task that has some security related element. Thus the task may, for example, be an email related task, a web browser related task, an online banking related task, a software update related task, etc., e.g. a task for which it is important to know that the computer workstation 105 has not been subject to an event that has or could compromise its security. In such tasks the security of the computer workstation 105 has the potential to be compromised and so the user 102 wants to check if this is the case.

The trusted device 101 is configured to perform visual analysis 104 of the task being executed on the workstation 105 and to superimpose an image 109 on the display of the workstation 105, i.e. that is viewable by the user 102 through the head-mounted augmented reality display of the trusted device 101. The superimposed image 109 helps to guide the user 102 through the task being executed on the workstation 105.

The trusted device 101, at least for (e.g. an initial) part of its operation, is operated in a secure mode in which it has no data connection with the workstation 105. During this part of its operation, the trusted device 101 therefore does not exchange data directly with the workstation 105. This means that the workstation 105, were its security to be compromised (e.g. by a virus), cannot infect the trusted device 101.

Figure 2:
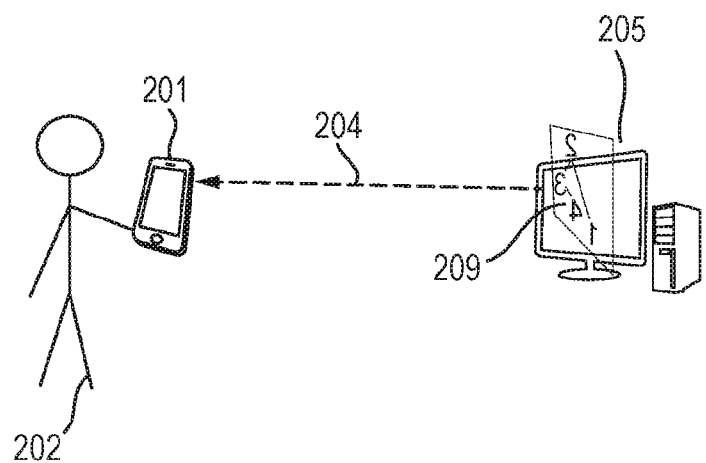
FIG. 2 shows schematically a device according to an embodiment of the invention.

FIG. 2 shows schematically a "trusted" device 201 according to another embodiment of the invention. The trusted device 201 is embodied as a mobile telephone to be used by a user 202. The trusted device 201 shown in FIG. 2 is configured in a similar way to the trusted device 101 shown in FIG. 1. Thus the trusted device 201 in FIG. 2 is configured to be used to assist the user 202 with a task to be completed that is being executed on a computer workstation 205. The task may again, for example, be a task that has some security related element. Thus the task may, for example, be an email related task, a web browser related task, an online banking related task, a software update related task, etc., e.g. a task for which it is important to know that the computer workstation 205 has not been subject to an event that has or could compromise its security.

The trusted device 201 is configured to perform visual analysis 204 of the task being executed on the workstation 205 and to superimpose an image 209 on the display of the workstation 205, i.e. that is viewable by the user 202 on the mobile telephone display of the trusted device 201. The superimposed image 209 helps to guide the user 202 through the task being executed on the workstation 205.

The trusted device 201, at least for (e.g. an initial) part of its operation, is operated in a secure mode in which it has no data connection with the workstation 205. During this part of its operation, the trusted device 201 therefore does not exchange data directly with the workstation 205.

Figure 3:
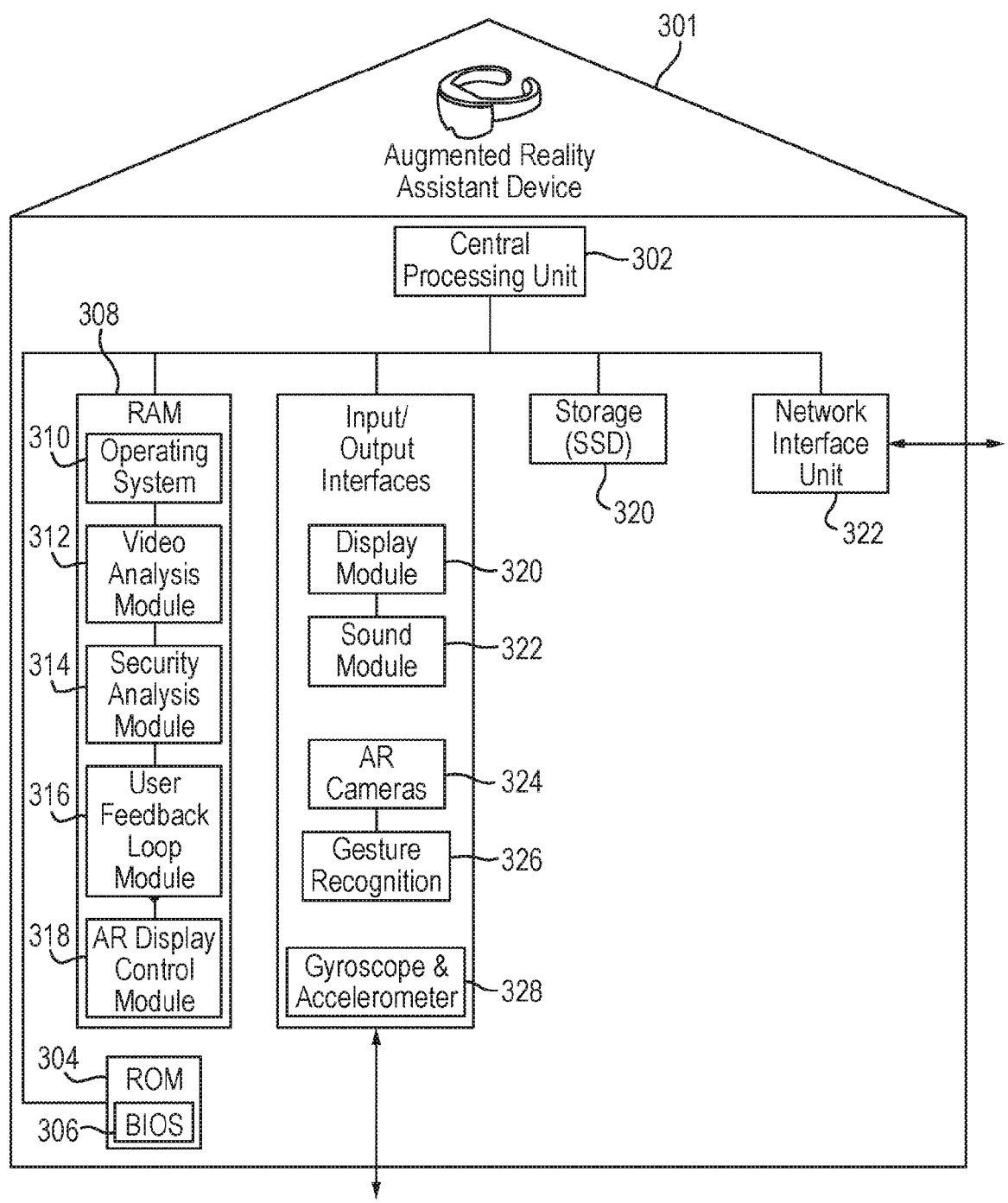
FIG. 3 shows schematically the hardware and software components of a device according to an embodiment of the invention.

FIG. 3 shows schematically the hardware and software components of a trusted device 301 according to an embodiment of the invention. The trusted device 301 may be embodied as the head-mounted augmented reality display device 101 as shown in FIG. 1 or as the mobile telephone device 201 as shown in FIG. 2.

The trusted device 301 includes a central processing unit (CPU) 302 that controls the operation of the trusted device 301. The CPU 302 is connected to, and controls or uses the operation of, multiple different components. The trusted device 301 includes read only memory (ROM) 304 and associated BIOS 306. The ROM 304 is used to store the firmware of the trusted device 301, for example.

The trusted device 301 also includes random access memory (RAM) 308 that is used to store the operating system 310 of the trusted device 301, along with various software modules. These software modules include a video analysis module 312, a security analysis module 314, a user feedback loop module 316 and an augmented display control module 318. The function of these modules will be described below.

The trusted device 301 includes a number of input/output interfaces that receive external inputs and/or generate outputs. The input/output interfaces are connected to the CPU 302, the ROM 304, the RAM 308, a solid-state drive (SSD) storage 320 and a network interface unit 322. The SSD storage 320 stores data for use or collected by the trusted device 301 and the network interface unit 322 controls the external data connection of the trusted device 301.

The input/output interfaces include a display module 320 and a sound module 322 arranged to control the audio-visual output of the trusted device 301. The input/output interfaces also include augmented reality (AR) cameras 324 arranged to capture frames of image data and gesture recognition sensors 326 arranged to detect the gestures of a user. The device 301 also includes a gyroscope and accelerometer 328 arranged to measure the rotational and linear movement of the trusted device 301.

Operation of the trusted device 301 will now be described with reference to FIGS. 1-3 and to FIG. 4. FIG. 4 shows a flow chart detailing operation of the trusted device 301 shown in FIG. 3 (e.g. embodied as either of the trusted devices 101, 201 shown in FIGS. 1 and 2) according to an embodiment of the invention. First, for a task that the user 102, 202 wishes to perform on a workstation 105, 205, the user 102, 202 directs the camera 324 of the trusted device 101, 201, 301 at the display screen of the workstation 105, 205. The camera 324 captures a sequence of frames of video image data of the display screen of the workstation 105, 205 and these frames of video image data are analysed by the video analysis module 312 to identify (detect) the display screen of the workstation 105, 205 (step 401, FIG. 4).

Once the display screen of the workstation 105, 205 has been detected, the video analysis module 312 analyses the captured frames of video image data to detect the task (application) that the user is performing (and thus which is active) on the workstation 105, 205 (step 403, FIG. 4).

The video analysis module 312 then looks up in a database (stored in the storage 320) to see if there are any "triggers" associated with the currently active application that is performing the task on the workstation 105, 205 (step 406, FIG. 4). This identifies if there are any indicators that the security of the currently active application may have been breached. For example, when the user 102, 202 is using an internet browser on the workstation 105, 205, a trigger may be something associated with the detection of a phishing attack.

If no triggers are identified, the video analysis module 312 continues to monitor and analyse the stream of frames of video image data captured by the camera 324 to detect active applications and any associated triggers.

If a trigger is identified, the relevant security analysis module 314 for this active applications and trigger is loaded (step 408, FIG. 4). The security analysis module 314 analyses the content on the display screen of the workstation 105, 205 from the captured frames of video image data (step 411, FIG. 4) and determines if it requires any further information to be able to instruct the user 102, 202 as to how to proceed further (step 415, FIG. 4).

If the security analysis module 314 does not require any further information (e.g. it has already captured sufficient information to be able to instruct the user 102, 202 as to how to proceed further), the security analysis module 314 provides the appropriate security advice to the user 102, 202 via the display module 320 and/or the sound module 322 of the trusted device 101, 201, 301 which is controlled by the display control module 318 (step 416, FIG. 4). Such security advice may be that the workstation 105, 205 has not been subject to an event that has or could compromise its security and so it is safe to continue working on to perform the intended task. Alternatively, security advice may be that the workstation 105, 205 has been subject to an event that has or could compromise its security, and that the user 102, 202 needs to stop using the workstation 105, 205 and seek help to resolve this problem, e.g. from an administrator.

If the security analysis module 314 requires further information, it requests the user to interact with the workstation 105, 205 (step 419, FIG. 4) in order to reveal the missing information to allow the trusted device 101, 201, 301 to provide the relevant security advice to the user 102, 202. Such interaction may be that the user 102, 202 is requested to move a cursor on the display 109, 209 of the workstation 105, 205, to click buttons on the workstation 105, 205, to type information into the workstation 105, 205, to insert a card (or other device) into the workstation 105, 205, etc.

The user feedback loop module 316 determines, from the processed video image data, if the user 102, 202 has followed the instructions correctly and re-issues the original or modified instructions (via the display module 320 and/or the sound module 322 of the trusted device 101, 201, 301) so that the user 102, 202 performs the correct interaction with the workstation 105, 205.

The security analysis module 314 waits for the user 102, 202 to interact as requested with the workstation 105, 205 (step 420, FIG. 4) and subsequently analyses the content on the display screen of the workstation 105, 205 (showing the response of the workstation 105, 205 to the user's interaction) from the captured frames of video image data from the AR cameras 234 (step 411, FIG. 4), as well as any captured data from the gesture recognition sensors 326 of the user's interaction with the workstation 105, 205.

As before, but now as a result of the user's interaction with the workstation 105, 205, the security analysis module 314 determines if it requires any further information to be able to instruct the user 102, 202 as to how to proceed further (step 415, FIG. 4). If so, the user 102, 202 is requested to interact further with the workstation 105, 205 (step 419, FIG. 4) until the security analysis module 314 possesses sufficient information to be able to instruct the user 102, 202 as to how to proceed further.

When the security analysis module 314 possesses sufficient information to be able to instruct the user 102, 202 as to how to proceed further (using the results of the user's interaction with the workstation 105), the security analysis module 314 provides the appropriate security advice to the user 102, 202 via the display module 320 and/or the sound module 322 of the trusted device 101, 201, 301 which is controlled by the display control module 318 (step 416, FIG. 4).

For example, the trusted device 101, 201, 301 may advise that the workstation 105, 205 has not been subject to an event that has or could compromise its security and so it is safe to continue working on to perform the intended task. Alternatively, security advice may be that the workstation 105, 205 has been subject to an event that has or could compromise its security, and that the user 102, 202 needs to stop using the workstation 105, 205 and seek help to resolve this problem, e.g. from an administrator.

A number of examples of an authentication device being used to verify the security of a security related task being performed on an electronic device will now be described.

EXAMPLE 1

In this first example, a user would like to perform a financial transaction using an online banking portal via a webpage. There is, however, always a possibility that website was loaded as a result of, e.g., clicking on a link in a malicious email as part of a phishing attempt designed to obtain the user's credentials fraudulently.

First, the user's browser on their computer (e.g. a workstation 105, 205 as shown in FIGS. 1 and 2) connects to the online banking webpage. Before entering any of their confidential credentials (e.g. passwords, PINs) for logging into the online banking portal, the user 102, 202 selects an authentication application on the trusted device 101, 201, 301 (e.g. their mobile telephone), which switches the trusted device 101, 201, 301 into a secure mode that prevents any data being exchanged between the trusted device 101, 201, 301 and the computer (alternatively, the authentication application may be running (e.g. continuously) in the background on the user's trusted device 101, 201, 301).

With the authentication application running, the user 102, 202 points the camera 324 of the trusted device 101, 201, 301 at the display screen of the computer. The trusted device 101, 201, 301 detects the display screen of the computer (step 401, FIG. 4).

The trusted device 101, 201, 301 then uses the video analysis module 312 to analyse the captured frames of video image data to detect the online banking task that the user is performing on the computer (step 403, FIG. 4) and determines if there are any security "triggers" associated with the online banking task (step 406, FIG. 4). The appropriate security analysis module 314 for the online banking task is loaded by the trusted device 101, 201, 301 (step 408, FIG. 4) and used to analyse the content of the online banking task on the display screen of the computer (step 411, FIG. 4).

At this stage, the security analysis module 314 may not require any further information and may be able to provides the appropriate security advice to the user 102, 202 via the display module 320 and/or the sound module 322 of the trusted device 101, 201, 301 (step 416, FIG. 4). This may be that the user 102, 202 is safe to continue with their online banking task or that they should stop owing to the computer security having been subject to an event (e.g. a cyber attack) that has or could compromise its security.

If the security analysis module 314 requires further information (step 415, FIG. 4), it issues instructions to the user 102, 202 to explore additional information associated with the webpage on which the online banking portal is being accessed (step 419, FIG. 4). Such instructions may be for the user 102, 202 to click on a certain icon, button or metadata (e.g. uniform resource locator (URL), uniform resource identifier (URI) or SSL data) on the webpage. The instructions may also be to input fake user details into the online banking portal to see if they are accepted as correct (since phishing websites often accept any input as being legitimate, if an obviously incorrect password is still accepted as being successful, this is a strong indication of a phishing attack). The instructions may also be to click on the browser's secure hypertext transfer protocol (HTTPS) icon to expose details about the SSL certificate that the online banking website uses (this allows the trusted device 101, 201, 301 to analyse if the certificate may be fabricated or may have expired, which may be an indication of a cyber attack). The instructions may also be to open the certificate manager on the computer to check which certificates are considered trusted (if there is a certificate which has been revoked or is generally considered non-standard, this may be an indication of a cyber attack)

These interactions change the content of the computer's screen, with these changes being captured by the camera 324 of the trusted device 101, 201, 301. The captured image data is analysed (step 411, FIG. 4) and the user feedback loop module 316 confirms that the user 102, 202 has followed the instructions correctly, e.g. owing to the change of content on the computer's screen. This process of instructing the user 102, 202 to interact with the computer and capturing image data of the user's interactions and of the computer's responses may be repeated until the trusted device 101, 201, 301 has gathered sufficient information to conclude whether the loaded online banking website is legitimate or is subject to a cyber (e.g. phishing) attack.

The trusted device 101, 201, 301 then advises the user that they may proceed with the intended interaction with the online banking portal or that they should stop their intended interaction and report the incident to an administrator (step 416, FIG. 4).

EXAMPLE 2

In a second example, a user would like to process quickly the multiple emails per day they receive, while ensuring that no phishing email succeeds in attempting to get the user to download attachments or click on links that could be malicious.

First, the user opens an email received on their computer (e.g. a workstation 105, 205 as shown in FIGS. 1 and 2). The email may include an attachment or a link that the user is instructed to open or follow. Before the user proceeds with any of these actions, the user 102, 202 selects an authentication application on the trusted device 101, 201, 301 (e.g. their mobile telephone), which switches the trusted device 101, 201, 301 into a secure mode that prevents any data being exchanged between the trusted device 101, 201, 301 and the computer (alternatively, the authentication application may be running (e.g. continuously) in the background on the user's trusted device 101, 201, 301).

With the authentication application running, the user 102, 202 points the camera 324 of the trusted device 101, 201, 301 at the display screen of the computer. The trusted device 101, 201, 301 detects the display screen of the computer (step 401, FIG. 4).

The trusted device 101, 201, 301 then uses the video analysis module 312 to analyse the captured frames of video image data to detect the email task that the user is performing on the computer (step 403, FIG. 4) and determines if there are any security "triggers" associated with the email task (step 406, FIG. 4). The appropriate security analysis module 314 for the email task is loaded by the trusted device 101, 201, 301 (step 408, FIG. 4) and used to analyse the content of the email task on the display screen of the computer (step 411, FIG. 4).

At this stage, the security analysis module 314 may not require any further information and may be able to provides the appropriate security advice to the user 102, 202 via the display module 320 and/or the sound module 322 of the trusted device 101, 201, 301 (step 416, FIG. 4). This may be that the user 102, 202 is safe to continue with their email task (e.g. open the attachment or follow the link) or that they should stop owing to the computer's security having been subject to an event (e.g. a cyber attack) that has or could compromise its security.

If the security analysis module 314 requires further information (step 415, FIG. 4), it issues instructions to the user 102, 202 to explore additional information associated with the email task (step 419, FIG. 4). Such instructions may be for the user 102, 202 to click on a certain icon, button or metadata (e.g. uniform resource locator (URL), uniform resource identifier (URI) or SSL data) in the email client.

The instructions may also be to click on or hover over the "sender" field in the email to expose details about the received email. For example, by expanding the sender's name, the full email address (and other header information) may be exposed and captured by the camera 324 of the trusted device 101, 201, 301. The security analysis module 314 of the trusted device 101, 201, 301 may use this information to detect whether the email has come from an already known or trusted sender.

These interactions change the content of the computer's screen, with these changes being captured by the camera 324 of the trusted device 101, 201, 301. The captured image data is analysed (step 411, FIG. 4) and the user feedback loop module 316 confirms that the user 102, 202 has followed the instructions correctly, e.g. owing to the change of content on the computer's screen. This process of instructing the user 102, 202 to interact with the computer and capturing image data of the user's interactions and of the computer's responses may be repeated until the trusted device 101, 201, 301 has gathered sufficient information to conclude whether the received is legitimate (e.g. from a known or verified source) or is from an unverified source and therefore potentially subject to a cyber (e.g. phishing) attack.

The trusted device 101, 201, 301 then advises the user that they may proceed with the intended interaction with the email or that they should stop their intended interaction and report the incident to an administrator (step 416, FIG. 4).

EXAMPLE 3

In the third example, a user would like to use an ATM to withdraw cash or to use a POS terminal to make a purchase with a credit or debit card, while ensuring that their card does not get skimmed and their security details stolen, e.g. by a fake terminal.

First, the user approaches the ATM or POS terminal (corresponding to the workstation 105, 205 as shown in FIGS. 1 and 2). Before interacting with the ATM or POS terminal, e.g. before entering their card, the user 102, 202 selects an authentication application on the trusted device 101, 201, 301 (e.g. their mobile telephone), which switches the trusted device 101, 201, 301 into a secure mode that prevents any data being exchanged between the trusted device 101, 201, 301 and the computer (alternatively, the authentication application may be running (e.g. continuously) in the background on the user's trusted device 101, 201, 301).

With the authentication application running, the user 102, 202 points the camera 324 of the trusted device 101, 201, 301 at the ATM or POS terminal. The trusted device 101, 201, 301 detects the ATM or POS terminal (step 401, FIG. 4).

The trusted device 101, 201, 301 then uses the video analysis module 312 to analyse the captured frames of video image data to perform visual analysis of the ATM or POS terminal (step 403, FIG. 4) and determines if there are any security "triggers" associated with the ATM or POS terminal (step 406, FIG. 4). The appropriate security analysis module 314 for the ATM or POS terminal is loaded by the trusted device 101, 201, 301 (step 408, FIG. 4) and used to analyse the content of the ATM or POS terminal (step 411, FIG. 4).

The trusted device 101, 201, 301 also uses information (e.g. obtained from an online database) to compare the observed ATM or POS terminal in the captured frames of video image data with the expected appearance. This may also use the position of the ATM or POS terminal (which may be registered as being known).

At this stage, the security analysis module 314 may not require any further information and may be able to provides the appropriate security advice to the user 102, 202 via the display module 320 and/or the sound module 322 of the trusted device 101, 201, 301 (step 416, FIG. 4). This may be that the user 102, 202 is safe to continue to use the ATM or POS terminal or that they should stop owing to the security of the ATM or POS terminal having been subject to an event (e.g. a cyber attack or the fitting of a skimming device) that has or could compromise its security.

If the security analysis module 314 requires further information (step 415, FIG. 4), it issues instructions to the user 102, 202 to explore additional information associated with the ATM or POS terminal (step 419, FIG. 4). Such instructions may be to ask the user 102, 202 to use the camera 324 to capture video image data of how the keypad or the card input on the ATM or POS terminal looks (the appearance of the keypad or the card input may then be compared to the expected appearance at that location to determine if the ATM or POS terminal may have been tampered with). The instructions may also ask the user 102, 202 to use the camera 324 to capture video image data of the serial number of the ATM or POS terminal (this can then be checked against the expected serial number of the ATM or POS terminal and then if the appearance in the captured video image data corresponds to the expected appearance of the ATM or POS terminal having that serial number).

These additional details are captured by the camera 324 of the trusted device 101, 201, 301. The captured image data is analysed (step 411, FIG. 4) and the user feedback loop module 316 confirms that the user 102, 202 has followed the instructions correctly, e.g. owing to the video image data captured. This process of instructing the user 102, 202 to interact with the ATM or POS terminal and capturing image data of the user's interactions and of the responses may be repeated until the trusted device 101, 201, 301 has gathered sufficient information to conclude whether the ATM or POS terminal is legitimate or has been tampered with.

The trusted device 101, 201, 301 then advises the user that they may proceed to use the ATM or POS terminal or that they should not use the ATM or POS terminal and report the ATM or POS terminal (step 416, FIG. 4).

The invention claimed is:

1. An authentication device for verifying the security of a task being performed on an electronic device operated by a user, wherein the authentication device is arranged to be operated by the user and comprises:

an image capture device for capturing image data of the electronic device and of the user interacting with the electronic device, wherein the image capture device is arranged to be directed towards the electronic device by the user;

processing circuitry for processing the captured image data to determine when the electronic device is performing a security related task and to determine when the electronic device has been subject to an event that has compromised or may compromise the security of the electronic device; and an audio or visual output for providing instructions to the user to interact with the electronic device and for advising the user that the electronic device has been subject to an event that has compromised or may compromise the security of the electronic device;

wherein the authentication device is arranged to operate in a secure mode, in which no data is exchanged between the authentication device and the electronic device, and wherein the authentication device is arranged to be operated by the user to control:

the image capture device to capture image data of the electronic device when the image capture device is directed towards the electronic device by the user;

the processing circuitry to process the captured image data to determine when the electronic device is performing a security related task;

the audio or visual output, when the processing circuitry has determined that the electronic device is performing a security related task, to provide instructions to the user to interact with the electronic device, wherein the instructions are based on the processing of the captured image data;

the image capture device to capture image data of the user interacting with the electronic device and the response of the electronic device to the user's interaction;

the processing circuitry to process the image data captured of the user interacting with the electronic device and the response of the electronic device to the user's interaction, to determine when the electronic device has been subject to an event that has compromised or may compromise the security of the electronic device; and the audio or visual output, when the processing circuitry has determined that the electronic device has been subject to an event that has compromised or may compromise the security of the electronic device, to advise the user that the electronic device has been subject to an event that has compromised or may compromise the security of the electronic device.

2. The authentication device as claimed in claim 1, wherein the processing circuitry comprises or implements one or both of:

a video capture module arranged to capture the image data from the image capture device and to identify the electronic device in the captured image data; or a video analysis module arranged to analyse the captured image data and to analyse the electronic device that has been identified in the captured image data by the video capture module.

3. The authentication device as claimed in claim 2, wherein the video analysis module is arranged to determine the type of security related task the electronic device is performing.

4. The authentication device as claimed in claim 1, wherein the processing circuitry comprises or implements one or both of:

a security analysis module arranged to determine if the electronic device has been subject to an event that has compromised or may compromise the security of the electronic device; or a feedback module arranged to determine when the user has followed the instructions provided to them correctly and is arranged to provide further instructions when the user has not followed the instructions correctly.

5. The authentication device as claimed in claim 1, wherein the audio or visual output comprises a display arranged to be overlaid on the electronic device.

6. The authentication device as claimed in claim 1, wherein the processing circuitry is arranged to determine when the electronic device has been subject to an event that has compromised or may compromise its security as part of the step of determining when the electronic device is performing a security related task.

7. The authentication device as claimed in claim 1, wherein the instructions comprise one or more of: instructing the user to move a cursor on the display of the electronic device, instructing the user to click buttons on the electronic device, instructing the user to type information into the electronic device, instructing the user to insert a card into the electronic device.

8. The authentication device as claimed in claim 1, wherein the processing circuitry compares the response of the electronic device to the user's interaction with the expected response when the electronic device has not been subject to an event that has compromised or may compromise the security of the electronic device, to determine when the electronic device has been subject to an event that has compromised or may compromise the security of the electronic device.

9. The authentication device as claimed in claim 1, wherein the processing circuitry is arranged to process the captured image data to determine when further information is required from the electronic device to determine when the electronic device has been subject to an event that has compromised or may compromise the security of the electronic device; and wherein the authentication device is arranged to control the audio or visual output, when the processing circuitry has determined that further information is required from the electronic device, to provide further instructions to the user to interact with the electronic device, wherein the instructions are based on the processing of the captured image data.

10. A method of verifying the security of a task being performed on an electronic device operated by a user, the method being performed on an authentication device comprising an image capture device, the authentication device being operated by the user and operating in a secure mode in which no data is exchanged between the authentication device and the electronic device, and the method comprising:

capturing image data of the electronic device, by directing the image capture device towards the electronic device;

processing the captured image data to determine when the electronic device is performing a security related task;

when the electronic device is determined to be performing a security related task, providing instructions to the user to interact with the electronic device, wherein the instructions are based on the processing of the captured image data;

capturing image data of the user interacting with the electronic device and of the response of the electronic device to the user's interaction;

processing the image data to determine when the electronic device has been subject to an event that has compromised or may compromise the security of the electronic device; and advising the user that the electronic device has been subject to an event that has compromised or may compromise the security of the electronic device, when the electronic device is determined to have been subject to an event that has been compromised or may compromise the security of the electronic device.

11. The method as claimed in claim 10, wherein the method further comprises processing the captured image data to identify the electronic device in the captured image data.

12. The method as claimed in claim 11, wherein the method further comprises processing the captured image data to analyse the electronic device that has been identified in the captured image data.

13. The method as claimed in claim 10, wherein the method further comprises processing the captured image data to determine the type of security related task the electronic device is performing.

14. The method as claimed in claim 10, wherein the method further comprises one or both of the steps of:

processing the captured image data to determine when the electronic device has been subject to an event that has compromised or may compromise the security of the electronic device; or processing the captured image data to determine when the user has followed the instructions provided to them correctly and providing further instructions when the user has not followed the instructions correctly.

15. The method as claimed in claim 10, wherein the method further comprises overlaying a display on the electronic device advising the user that the electronic device has been subject to an event that has compromised or may compromise the security of the electronic device, when the electronic device is determined to have been subject to an event that has been compromised or may compromise the security of the electronic device.

16. The method as claimed in claim 10, wherein the method further comprises processing the captured image data to determine when the electronic device has been subject to an event that has compromised or may compromise its security as part of the step of determining when the electronic device is performing a security related task.

17. The method as claimed in claim 10, wherein the instructions comprise one or more of: instructing the user to move a cursor on the display of the electronic device, instructing the user to click buttons on the electronic device, instructing the user to type information into the electronic device, instructing the user to insert a card into the electronic device.

18. The method as claimed in claim 10, wherein the method further comprises processing the captured image data to compare the response of the electronic device to the user's interaction with the expected response when the electronic device has not been subject to an event that has compromised or may compromise the security of the electronic device, to determine when the electronic device has been subject to an event that has compromised or may compromise the security of the electronic device.

19. The method as claimed in claim 10, wherein the method further comprises processing the captured image data to determine when further information is required from the electronic device to determine when the electronic device has been subject to an event that has compromised or may compromise the security of the electronic device; and providing further instructions to the user to interact with the electronic device, when it has been determined that further information is required from the electronic device, wherein the instructions are based on the processing of the captured image data.

20. A non-transitory computer readable storage medium storing computer software code which when executing on a data processing system of an authentication device performs a method of verifying the security of a task being performed on an electronic device operated by a user, wherein the authentication device comprises an image capture device arranged to be directed towards the electronic device by the user and wherein the authentication device is operated by the user and is operating in a secure mode in which no data is exchanged between the authentication device and the electronic device, and the method comprising:
  processing captured image data, captured by the user directing the image capture device towards the electronic device, to determine when the electronic device is performing a security related task;
  when the electronic device is determined to be performing a security related task, providing instructions to the user to interact with the electronic device, wherein the instructions are based on the processing of the captured image data;
  processing the image data of the user interacting with the electronic device and of the response of the electronic device to the user's interaction to determine when the electronic device has been subject to an event that has compromised or may compromise the security of the electronic device; and
  advising the user that the electronic device has been subject to an event that has compromised or may compromise the security of the electronic device, when the electronic device is determined to have been subject to an event that has been compromised or may compromise the security of the electronic device.

* * * * *